United States Patent
Coldrey et al.

(10) Patent No.: US 9,083,421 B2
(45) Date of Patent: Jul. 14, 2015

(54) TRANSCEIVER AND A REPEATER

(75) Inventors: Mikael Coldrey, Landvetter (SE); Pal Frenger, Linkoping (SE); Patrik Persson, Grabo (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 254 days.

(21) Appl. No.: 13/256,782

(22) PCT Filed: Apr. 29, 2009

(86) PCT No.: PCT/EP2009/055198
§ 371 (c)(1),
(2), (4) Date: Sep. 15, 2011

(87) PCT Pub. No.: WO2010/105700
PCT Pub. Date: Sep. 23, 2010

(65) Prior Publication Data
US 2012/0003926 A1    Jan. 5, 2012

Related U.S. Application Data

(60) Provisional application No. 61/161,473, filed on Mar. 19, 2009.

(51) Int. Cl.
  *H04B 7/15*   (2006.01)
  *H04B 7/155*  (2006.01)
  *H04B 7/06*   (2006.01)

(52) U.S. Cl.
  CPC .......... *H04B 7/15557* (2013.01); *H04B 7/0632* (2013.01); *H04B 7/15592* (2013.01)

(58) Field of Classification Search
  CPC .......... H03K 17/04206; H03K 17/162; H03K 17/165; H03K 17/6874; H03K 17/785
  See application file for complete search history.

(56) References Cited

U.S. PATENT DOCUMENTS

| | | | |
|---|---|---|---|
| 7,139,527 B2 | 11/2006 | Tamaki et al. | |
| 7,463,673 B2 | 12/2008 | Fujii et al. | |
| 7,613,423 B2 * | 11/2009 | Ngo et al. | 455/18 |

(Continued)

FOREIGN PATENT DOCUMENTS

| | | |
|---|---|---|
| CN | 1428943 A | 7/2003 |
| CN | 1773886 A | 5/2006 |

(Continued)

OTHER PUBLICATIONS

Office Action and partial English translation issued in corresponding Japanese Application No. JP2012-500087, on Nov. 5, 2013, 6 pages.

(Continued)

*Primary Examiner* — Bobbak Safaipour
(74) *Attorney, Agent, or Firm* — Rothwell, Figg, Ernst & Manbeck, P.C.

(57) ABSTRACT

The invention discloses a transceiver (210, 215; 305, 310, 320, 330) for use in a cellular communications system (200, 300), arranged to communicate with at least one other transceiver in the system by means of technology for Multiple Input Multiple Output, MIMO. The transceiver is also arranged to control the function of a repeater (206, 207, 208, 209; 340) which is arranged to forward communication between the transceiver and said at least one other transceiver, said control being carried out as a result of measured performance parameters of the communication between the transceiver and said at least one other transceiver. In one embodiment, the function in the repeater (206, 207, 208, 209; 340) which the transceiver is arranged to control comprises activation and deactivation of the repeater.

35 Claims, 3 Drawing Sheets

(56) References Cited

U.S. PATENT DOCUMENTS

| | | |
|---|---|---|
| 7,826,337 B2 | 11/2010 | Shi et al. |
| 7,843,887 B2 | 11/2010 | Haga et al. |
| 7,881,247 B2 * | 2/2011 | Pan et al. ............... 370/319 |
| 8,565,253 B2 | 10/2013 | Sandhu |
| 2003/0124976 A1 | 7/2003 | Tamaki et al. |
| 2003/0133422 A1* | 7/2003 | Bims ..................... 370/328 |
| 2005/0190821 A1* | 9/2005 | Fujii et al. ............... 375/211 |
| 2006/0009191 A1 | 1/2006 | Malone, III |
| 2006/0105709 A1 | 5/2006 | Oh et al. |
| 2007/0047484 A1* | 3/2007 | Bims ..................... 370/328 |
| 2010/0273415 A1* | 10/2010 | Almgren et al. ............ 455/7 |
| 2012/0003926 A1* | 1/2012 | Coldrey et al. ............ 455/9 |
| 2013/0310025 A1* | 11/2013 | Black et al. ............... 455/423 |

FOREIGN PATENT DOCUMENTS

| | | |
|---|---|---|
| JP | 2003198442 A | 7/2003 |
| JP | 2005229524 A | 8/2005 |
| JP | 2006121703 A | 5/2006 |
| JP | 2006-157848 A | 6/2006 |
| JP | 2007-502071 A | 2/2007 |
| JP | 2007181166 A | 7/2007 |
| JP | 2008512930 A | 4/2008 |
| WO | 2005088914 A1 | 9/2005 |
| WO | 2007130324 A2 | 11/2007 |
| WO | 2009006092 A1 | 1/2009 |

OTHER PUBLICATIONS

English translation of Search Report issued in corresponding Chinese Patent Application No. 200980158309.0, on Aug. 27, 2013, 2 pages.

English translation of Office Action in corresponding Japanese Patent Application No. 2012-500087, issued on May 28, 2013, 2 pages.

* cited by examiner

TRANSCEIVER AND A REPEATER

CROSS-REFERENCE TO RELATED APPLICATION

This application is a 35 U.S.C. §371 National Phase Entry Application from PCT/EP2009/055198, filed Apr. 29, 2009, designating the United States, which claims priority to U.S. Provisional Application No. 61/161,473, filed Mar. 19, 2009, the disclosure of which is incorporated by reference herein in its entirety.

TECHNICAL FIELD

The present invention is directed towards a MIMO transceiver for use in a cellular communications system. The invention also discloses a repeater for a cellular communications system.

BACKGROUND

In modern cellular communication systems, so called MIMO technology, multiple-input multiple-output, is often used in order to enhance the performance of the system.

MIMO systems are known to outperform non-MIMO systems if the wireless medium supports a so called "rich" communications channel, i.e. one with a significant amount of multipath propagation between the transmitting and the receiving party.

A high degree of multipath propagation typically leads to a so called "high-rank" MIMO channel, which can be used for an increase in the data rate by transmission of multiple simultaneous data streams or for increased error protection by using diversity techniques over the MIMO channel.

However, if there is a low degree of multipath propagation, the MIMO channel might be "rank deficient", and therefore not able to support the desired kinds of MIMO techniques. This is especially the case in pure line-of-sight, LOS, conditions, where there is no multipath propagation, or the reflected paths are too weak compared to the direct path, so that the MIMO channel becomes practically rank deficient.

In addition to requiring high rank channels, MIMO techniques also typically require high signal-to-noise ratio, SNR, in order to provide good performance.

However, a rich multipath environment, which is associated with high rank channels, typically also lead to strong signal attenuation due to multiple reflections, etc. and, thus, too low SNR.

SUMMARY

As has emerged from the text above, there is a need for a solution by means of which a MIMO channel in a cellular communications system can be given an increased rank or increased multipath propagation, whilst also preferably increasing the SNR of the channels used for MIMO.

Such a solution is offered by the present invention in that it discloses a transceiver for use in a cellular communications system which is arranged to communicate with at least one other transceiver in the system by means of technology for Multiple Input Multiple Output, MIMO.

The transceiver of the invention is also arranged to control the function of a repeater which is arranged to forward communication between the transceiver and the at least one other transceiver, with the transceiver's control of the repeater being carried out as a result of measured performance parameters of the communication between the transceiver and the at least one other transceiver.

Thus, the transceiver of the invention can influence the communications channel to the at least one other transceiver by means of controlling the function of the repeater. In one embodiment, the function in the repeater which the transceiver is arranged to control comprises activation and deactivation of the repeater, i.e. the transceiver can turn the repeater ON/OFF, thus increasing or decreasing the rank of the MIMO channel, since the repeater's state (ON/OFF) will influence the multipath propagation.

In one embodiment, the function in the repeater which the transceiver is arranged to control comprises the amplitude and/or the phase of the forwarded signal, so that the channel gets a number of equally strong so called "singular values", which is beneficial, particularly at high SNR values.

In one embodiment, the measured performance parameters are measured by the transceiver itself, whilst in another embodiment, the measured performance parameters are measured by said at least one other transceiver and reported to the transceiver for action.

The transceiver of the invention is, in one embodiment, a controlling node for a cell in the system, such as, for example, an LTE eNodeB. In one embodiment, the transceiver of the invention is a user terminal.

The invention also discloses a repeater for use in a cellular communications system, which is arranged to forward communications between a first and a second transceiver in the system. The repeater of the invention is arranged to have its function remote controlled from an external source, such as, for example, one of said transceivers between which it is arranged to forward communication.

The invention also discloses a cellular communications system with a transceiver as mentioned above.

These and other embodiments will be described in more detail in the text below.

BRIEF DESCRIPTION OF THE DRAWINGS

The invention will be described in more detail in the following, with reference to the appended drawings, in which FIG. 1 show an example of a prior art system in which the present invention can be applied.

DETAILED DESCRIPTION

The invention will be described in detail below. Use will be made of terms which may be specific to the so called LTE system, Long Term Evolution, but it should be understood that this is merely in order to facilitate the reader's understanding of the invention, and should not be used to limit the scope of protection sought for or given to the invention, since the invention can be used in a large number of different kinds of cellular communications systems, such as, for example, CDMA 2000 and TD SCDMA. The invention can also be applied in non-cellular wireless communications systems, such as, for example, WLAN systems.

Figure 1:
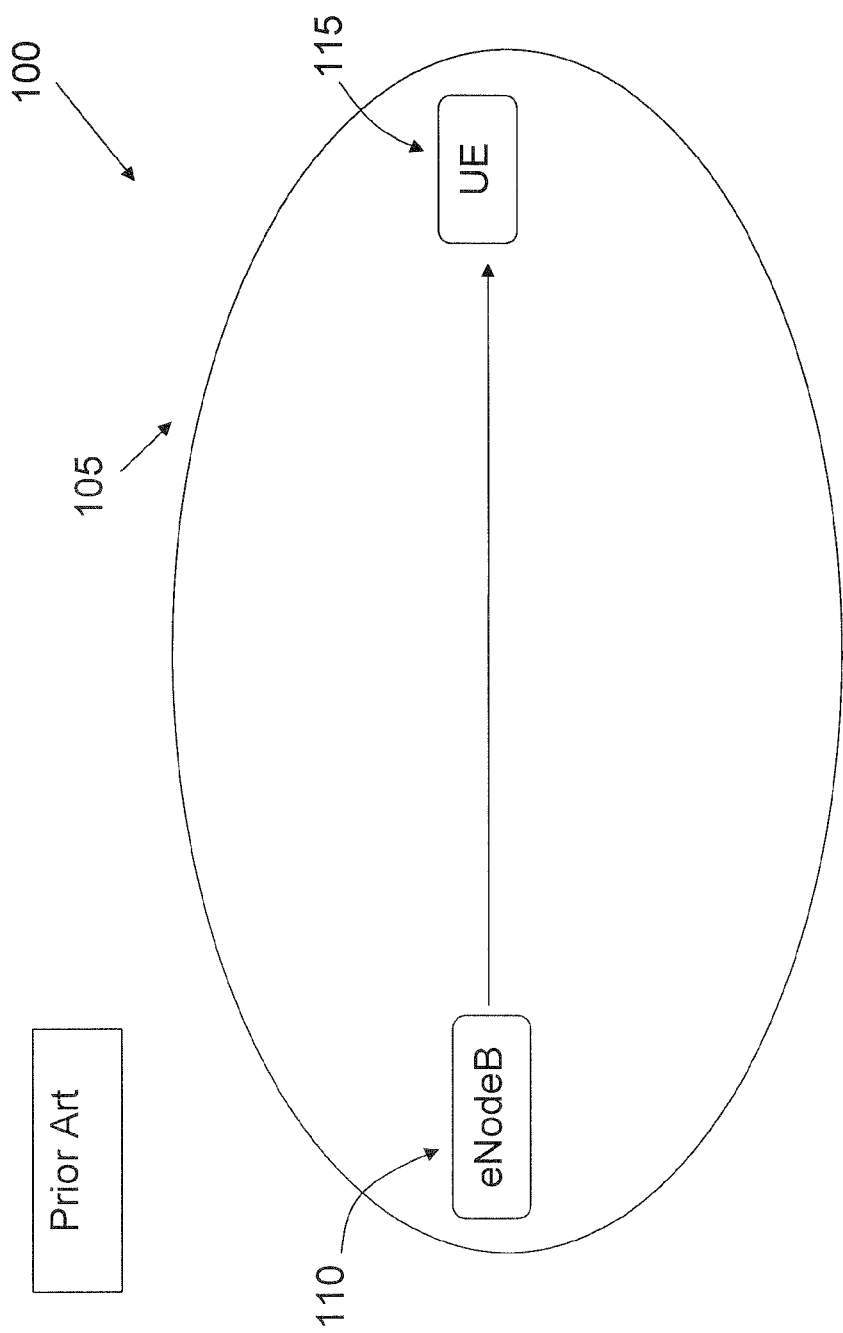

FIG. 1 shows a cell 105 in a traditional cellular communications system 100. In the cell 105, there is a controlling node, a so called Radio Base Station, which in LTE systems is known as the eNodeB. The cell 105 is also arranged to accommodate a number of users, such as the one shown as UE (User Equipment) 115. The eNodeB 110 routes communication to and from the UE 115.

In a system such as the one 100 shown in FIG. 1, so called MIMO technology, Multiple Input Multiple Output, could be used to enhance the communication between the UE 115 and the eNodeB 110. However, as shown in FIG. 1, there is "only" line of sight, LOS, propagation between the UE and the eNodeB, which is detrimental to MIMO technology, since MIMO relies on a so called "rich" channel, i.e. one in which there is multipath propagation, so that there are at least two alternative propagation paths between the eNodeB and the UE. (It should be noted that these two alternative propagation paths do not need to include a line of sight path.)

Since MIMO technology provides the system 100 with a number of advantages, such as, for example, a higher degree of data throughput, the invention aims at providing a rich channel even where one is not naturally present, such as in the cell 105 shown in FIG. 1. How this is achieved by the invention is shown schematically in FIG. 2, which shows a cell 205 in a system 200 which is basically similar to the cell 105 of the prior art system 100 in FIG. 1.

Figure 2:
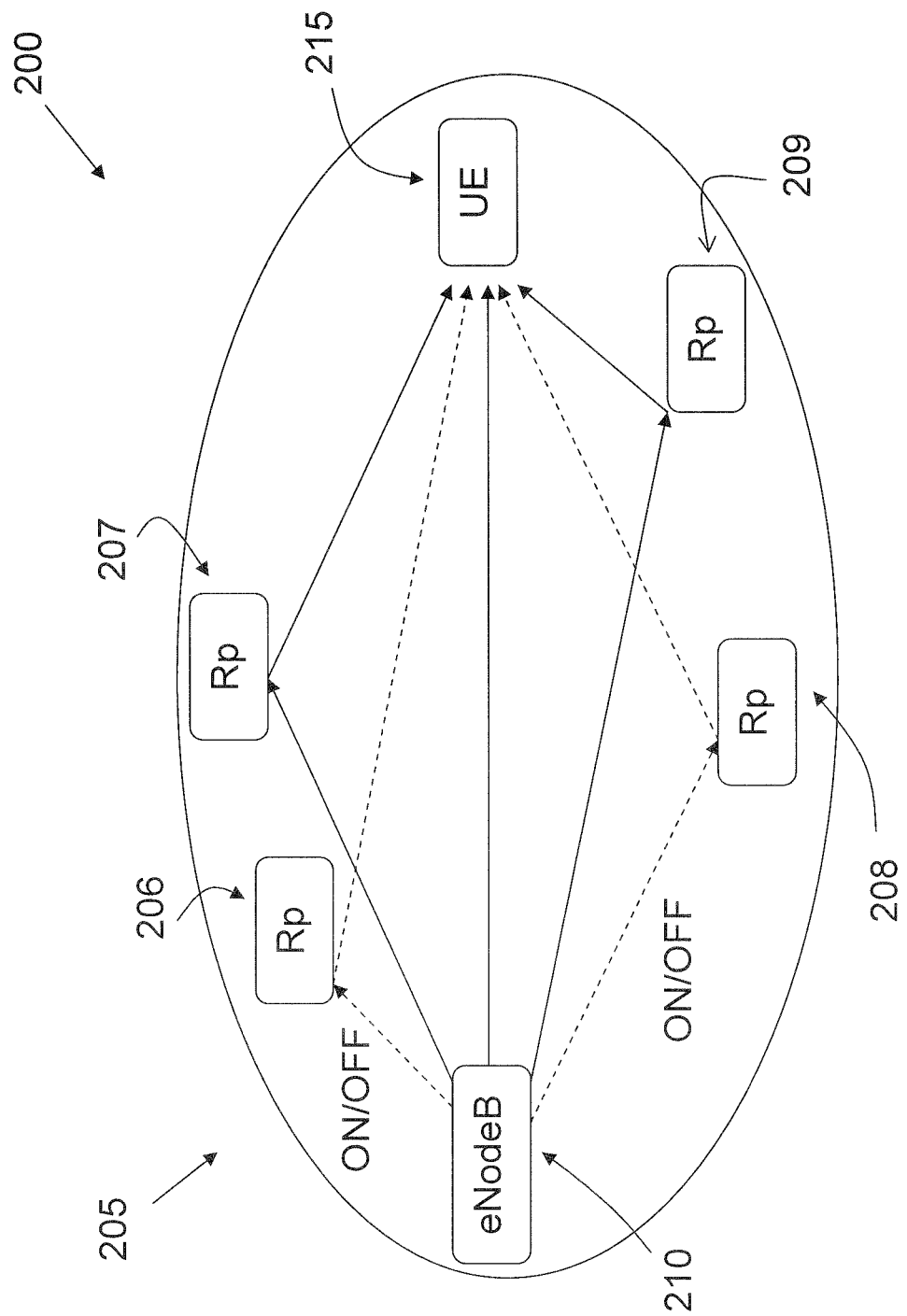
FIG. 2 shows the system of FIG. 1 with one embodiment of the invention applied.

However, as indicated in FIG. 2, a difference between the two systems 100 and 200 is that at least one cell 205 in the system 200 is equipped with at least one repeater; a number of repeaters "Rp", 206, 207, 208, 209 are shown in FIG. 2. A basic function of the repeaters is to forward communication between the eNodeB 210 and the UE 215, and, as indicated by means of arrows, the presence of repeaters in the cell 205 increases the "rank" of the channel between the eNodeB 210 and the UE 215, since the repeaters will create the conditions for multipath propagation between the eNodeB and the UE, so that a "rich" channel is obtained.

However, depending on a number of factors, such as, for example, the topography of the cell 205, the antenna radiation diagrams in the eNodeB and the UE, and the antenna polarizations, one or more of the repeaters 206-209 may not contribute significantly to the rank of the communications channel between the NodeB and the UE. In such a case, according to the invention, the repeater in question can be turned off, and then be turned on again if the conditions change.

To this end, i.e. the turning on or off of a repeater, the eNodeB of the invention is arranged to control the function of a repeater as a result of measured performance parameters of the communication between the eNodeB and at least one UE.

The control signals from the controlling transceiver, i.e. in this case the eNodeB, can either be sent on a dedicated channel for this in the system or it control signals can be sent on other channels in the system, such as other control channels.

The measured performance parameters will be described in more detail later, but first, functions in a repeater which are arranged to be controlled by the eNodeB will be enumerated. As mentioned previously, one example of a function in the repeater which is arranged to be "remote controlled" is the basic function of the repeater, so that the repeater's ability to forward communication between the eNodeB and the UE is activated or deactivated. This can, for example, comprise turning on and off one or more amplifiers in the repeater, or powering on/off of the entire repeater. It should thus be noted that the repeater of the invention is an active one in the sense that it is connected to (or comprises) a power source.

Another function in the repeater which it is suitable to arrange for "remote control" is the amplitude and/or the phase of the forwarded signal. In other words, if a repeater receives, for example, a signal from the eNodeB and then forward this signal to an UE, the repeater will first amplify the signal and give it a desired phase before retransmitting it to the UE. Thus, the repeater will have an antenna which is used for forwarding the signals to the receiving party. This antenna can have a number of radiation elements, so that the antenna can either be a "traditional" antenna with one radiation element, or it can be a so called array antenna with a plurality of radiation elements. The phase control for the forwarded signal can be applied in ether kind of antenna, i.e. either an antenna with one radiation element or an array antenna. In the case of an array antenna, the amplitude and phase control can be used for so called "beam forming" of the forwarded signal.

A purpose in influencing the gain and phase of the forwarded signal can be to ensure that the receiving party, in this case the UE, receives a number of equally strong signals, one on each of the MIMO "sub channels", i.e. so that equally strong so called "singular values" are obtained, since this is well known to optimize the channel capacity at high SNR. The gain and phase of the forwarded signal can be influenced by means of one or more controllable amplifier and delay line in the repeater.

Turning now to the issue of the performance parameters which are measured and used in order to control the function of a repeater of the invention, it should first be mentioned that the control of the repeater of the invention is possible both from an eNodeB or from an UE; in other words, the invention discloses both an eNodeB and an UE which is arranged to control the function of a repeater. To use a more generic term, the invention discloses a transceiver (eNodeB or UE) which is arranged to control a repeater. For this reason, it will be realized that a number of alternatives are possible:

1) The "controlling transceiver" measures the performance parameters and then carries out the control of the repeater.
2) The performance parameters are measured by the transceiver with which the controlling transceiver communicates, and are then reported to the controlling transceiver for control of the repeater.
3) The measured performance parameters are forwarded to a node which is external to the cell 205, such as a controlling node which serves to control the eNodeB 210. The controlling node makes the decisions regarding the control of the repeater or repeaters in the cell 205, and then forwards the decisions to the controlling transceiver, which executes the decisions.

However, as an example, in order to illustrate the invention, the case where the eNodeB controls the repeater and the performance characteristics are measured by the UE and forwarded to the eNodeB for action will be used.

Examples of performance characteristics which are measured by the UE and then forwarded to the eNodeB comprise the rank of the MIMO channel, and/or the so called CQI, the Channel Quality Indicator, of the MIMO channel, i.e. each so called "sub channel" in the MIMO communication. If, for example, the CQI is sufficient, or above a certain threshold, the eNodeB can deactivate at least one repeater, to see what the effect on the measured parameter or parameters will be. Conversely, of course, if the reported rank and/or the CQI for one or more sub channels is insufficient, a deactivated repeater can be activated. Thus, the measured performance parameters comprise the rank of one or more MIMO channel and/or the CQI of the MIMO channel.

The issue of activating and deactivating one or more repeaters in the system can also be seen as choosing a subset of repeaters in the system which are to be activated. Below, some examples will be given of principles which can be used in the invention when choosing such a subset of repeaters:

Depending on, for example, the antenna radiation patterns, polarizations, and the repeater locations in relation to the eNodeB and the UE, all of the repeaters may not contribute significantly to a certain performance parameter, and, thus, do not need to be activated.

An example of a performance parameter is the previously discussed channel rank Q which is limited upwards by the minimum number of transmitter or receiver antennas in the UE or the eNodeB. Hence, there is no point in activating more repeaters than needed to fulfil the maximum rank criteria as given by the number of transmitter or receiver antennas.

Another example is that a repeater which is located along the LOS path between the eNodeB and the UE does not contribute to the rank since it will only amplify a rank deficient LOS channel. Also, a particular repeater might be too far away from the eNodeB and/or the UE, so that large path loss might therefore make the repeater unfeasible or unnecessary to use.

Also, from a system performance point of view, one or more repeaters might be unfeasible to use if they cause sufficiently severe interference to other users, for example users in adjoining or adjacent cells.

Several criteria can be used when it comes to choosing a subset of repeaters, such as, for example:
1) Attain a desired, e.g. maximum, channel rank
2) Optimize a function of the singular values:
   a. For a certain channel rank, choose (activate) the subset of repeaters which gives the smallest ratio between the largest and smallest singular values, i.e. the channel condition number.
   b. For a certain channel rank Q, choose (activate) the subset of repeaters which renders the largest value of the smallest singular value $\lambda_g$, i.e. the "strongest weak channel".
3) Choose the subset of repeaters that fulfils a certain capacity or throughput requirement or maximizes it.
4) Choose the subset of repeaters based on which ones have the largest composite channel path gains. This criterion will primarily serve to increase the SNR.

The optimal subset of repeaters can be found by means of a search over all the possible repeater combinations. The number of possible combinations when choosing K repeaters out of N available repeaters is given by:

$$\binom{N}{K} = \frac{N!}{K!(N-K)!} \quad (1)$$

As an example, equation (1) above yields 35 possible choices when it comes to choosing 3 out of 7 repeaters. Depending on system functionality (controllability of repeaters, availability of channel knowledge, etc.), a process which decides how many and which repeaters that should be activated in order to optimize a particular criterion can be implemented either in the eNodeB or in a controlling node for the eNodeB or in a UE.

Figure 3:
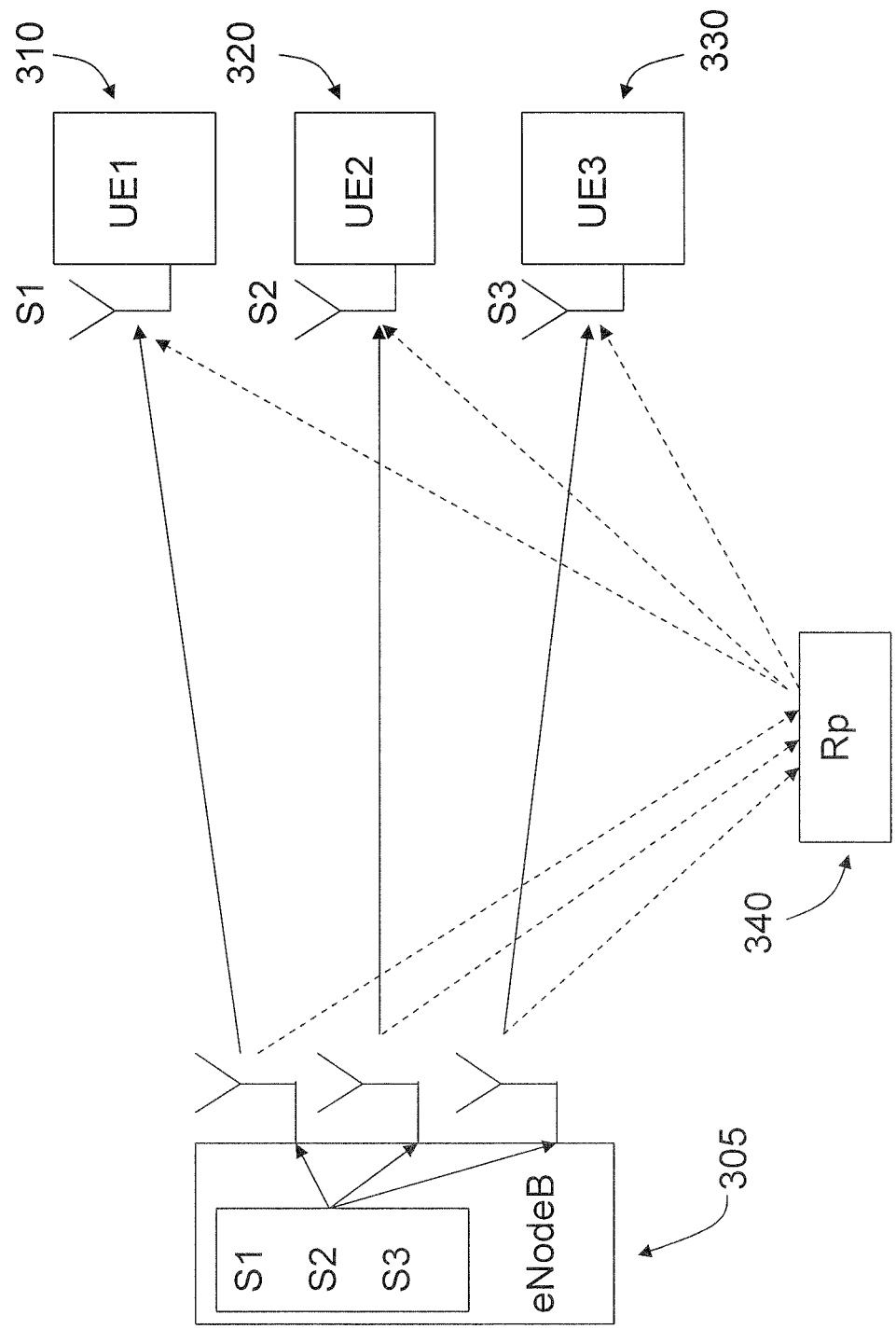
FIG. 3 shows a further embodiment of the invention.

FIG. 3 shows an embodiment in which the invention is used for a slightly different purpose than in the system 200 in FIG. 2: in the system 200 of FIG. 2, the invention is used in order for the eNodeB 210 to transmit a plurality of data streams to one and the same UE via MIMO technology, so called single user MIMO, "SU-MIMO". As an alternative to this, the invention can also be used for so called Multi User MIMO, "MU-MIMO", in which an eNodeB transmits a plurality of data streams, each of which is intended for one of a plurality of users.

In MU-MIMO, the same resource blocks (using an LTE term as an example) are scheduled to transmit data to more than one user, with the data for each user being transmitted as a separate data stream. Each data stream is given a different so called pre-coding or beam forming in the eNodeB prior to being transmitted, or as it is transmitted, in order to ensure that each data stream reaches only the intended UE. This may be facilitated by ensuring that the transmitted data streams are separated spatially, so that a sufficient degree of orthogonality is obtained between the different data streams. Pre-coding and beam forming as such are well known to those skilled in the art, and will thus not be explained here.

As shown in the example in FIG. 3, the eNodeB 305 is equipped with a plurality of antennas, in this case three antennas, which is naturally only an example. Using three antennas, the RBS 305 can transmit a maximum of three data streams, each of which is transmitted from each of the three antennas. Expressed in more general terms, in order for MIMO transmission to be successful. N antennas should be used to transmit at the most N data streams.

In the example shown in FIG. 3, each of the three data streams is intended for one of three UEs, so that three data streams S1, S2, S3 are transmitted, intended for UE1, UE2, UE3, respectively.

In the example shown in FIG. 3, the RBS 305 has Line of Sight to each of the UEs. By means of a repeater 340 of the invention, the orthogonality between the data streams S1. S2, S3 can be increased sufficiently so that adequate MU-MIMO performance can be obtained between the RBS 305 and the UEs. Naturally, more than one repeater can be used in this embodiment also, depending on the needs of the system; the use of one repeater 340 is merely an example intended to facilitate the reader's understanding of this aspect of the invention.

The repeater 340 is controllable from the RBS 305 according to the invention, so that the RBS 305 activates and deactivates the repeater 340 according to criteria which are measured by, for example, the UEs, and reported back to the RBS. Examples of parameters which are measured and then used by the RBS to control the activation/deactivation of the repeater 340 are parameters related to the entire channel as a function of time and frequency: the phrase "the entire channel" here refers to the channel between each transmitting and each receiving antenna. The entire channel can then be seen as a matrix, transmitting antennas*receiving antennas, which can then be likened to the impulse answer in a linear system. Using this knowledge, the RBS can determine which users it can transmit to, and how to transmit to them. If the intended receivers aren't sufficiently orthogonal with respect to each other, the RBS can, for example, test by activating different repeaters in order to influence the channel.

It should be noted that in the example shown in FIG. 3, as was also the case with the example shown in FIG. 2, the control of the repeater 340 can be carried out by the RBS as well as by the UEs, although only control by the RBS has been explicitly mentioned in the description of FIG. 3 above.

Naturally, the control of the repeater which is exercised by the RBS or the UEs in the example shown in FIG. 3 can also comprise the phase and/or gain of the repeater as well as activation/deactivation of the repeater.

The invention is not limited to the examples of embodiments described above and shown in the drawings, but may be freely varied within the scope of the appended claims. It should also be pointed out that the repeater of the invention can also be seen as a relay station in the system, since a repeater can be seen as a type of relay station.

The invention claimed is:
1. A transceiver for use in a cellular communications system, the transceiver being arranged to:

communicate with at least one other transceiver in said system by means of technology for Multiple Input Multiple Output;

activate a first subset of a plurality of repeaters, wherein the first subset of the plurality of repeaters are activated upon determining that the first subset of repeaters:
  (i) fulfils a predetermined requirement for capacity or throughput, or
  (ii) maximize capacity or throughput, or
  (iii) has a composite channel path gain which exceeds a predetermined threshold; and control the activated first subset of repeaters arranged to forward communication between the transceiver and said at least one other transceiver, said control being carried out as a result of measured performance parameters of the communication between the transceiver and said at least one other transceiver, wherein the transceiver is operable to control one or both of the amplitude and phase of a signal transmitted by each repeater in the first subset that corresponds to a signal transmitted by the transceiver.

2. The transceiver of claim 1, wherein the transceiver is operable to deactivate each repeater in the first subset of repeaters based on the measured performance parameters.

3. The transceiver of claim 1, in which said measured performance parameters are measured by the transceiver itself.

4. The transceiver of claim 1, in which said measured performance parameters are measured by said at least one other transceiver and reported to the transceiver.

5. The transceiver of claim 1, in which the measured performance parameters comprise the rank of one or more MIMO channels.

6. The transceiver of claim 1, wherein the transceiver is a controlling node for a cell in the system.

7. The transceiver of claim 6, wherein the transceiver is an LTE eNodeB.

8. The transceiver of claim 1, wherein the transceiver is a user terminal for the system.

9. A repeater for use in a cellular communications system, the repeater being arranged to:

forward communications between a first and a second transceiver in said system, wherein the repeater is arranged to have a function of the repeater be remote controlled from an external source, wherein said function which is arranged to be remote controlled comprises one or both of the amplitude and phase of a forwarded signal, wherein said function which is arranged to be remote controlled further includes the activation of the repeater upon determining that the repeater:
  (i) fulfils a predetermined requirement for capacity or throughput, or
  (ii) maximize capacity or throughput, or
  (iii) has a composite channel path gain which exceeds a predetermined threshold.

10. The repeater of claim 9, in which said external source comprises at least one of said transceivers.

11. The repeater of claim 9, in which said function which is arranged to be remote controlled further comprises deactivation of the repeater based on measured performance parameters.

12. The repeater of claim 9, in which the external source is a controlling node for a cell in the system.

13. The repeater of claim 12, in which the external source is an LTE eNodeB.

14. The repeater of claim 9, in which the external source is a user terminal in the system.

15. A cellular communications system comprising:

at least a first cell with a first transceiver which is arranged to communicate with other transceivers in the cell by means of technology for Multiple Input Multiple Output (MIMO), wherein the first transceiver is configured activate a first subset of a plurality of repeaters upon determining that the first subset of repeaters:
  (i) fulfils a predetermined requirement for capacity or throughput, or
  (ii) maximize capacity or throughput, or
  (iii) has a composite channel path gain which exceeds a predetermined threshold, wherein the first transceiver is arranged to control the function of each repeater of the first subset of repeaters which are arranged to forward communication between the first transceiver and at least one of said other transceivers in the cell, wherein said function in each repeater of the first subset of repeaters which the first transceiver is arranged to control comprises one or both of the amplitude and phase of a forwarded signal.

16. The system of claim 15, in which said function in each repeater of the first subset of repeaters which the first transceiver is arranged to control further comprises deactivation of each repeater in the first subset of repeaters based on measured performance parameters.

17. The system of claim 15, in which said measured performance parameters are measured by the first transceiver itself.

18. The system of claim 15, in which said measured performance parameters are measured by said at least one other transceiver and reported to the first transceiver.

19. The system of claim 15, in which the measured performance parameters comprise the rank of one or more MIMO channels.

20. The system of claim 15, in which the first transceiver is a controlling node for a cell in the system.

21. The system of claim 15, in which the first transceiver is an LTE eNodeB.

22. The system of claim 15, wherein the first transceiver is an LTE user terminal.

23. The system of claim 15, in which the first transceiver is arranged to activate the first subset of a plurality of repeaters and to deactivate a second subset of the plurality of repeaters, said activation and deactivation being based on predetermined criteria.

24. The system of claim 15, in which said predetermined criteria include the rank and/or the CQI of the channel between the first transceiver and at least one user in the first cell.

25. The system of claim 23, in which said predetermined criteria include the interference caused by a second repeater to the communication between the first transceiver and at least one other transceiver.

26. The system of claim 23, in which the first transceiver is arranged to activate and/or deactivate first and/or second subsets of repeaters based on one or more of the following criteria:

for a certain channel rank Q to one or more user in the first cell, activate only the subset which renders the smallest ratio between the largest and smallest singular values, i.e. the channel condition number, for a certain channel rank Q to one or more user in the first cell, activate only the subset that renders the largest value for the smallest singular value $\lambda_Q$, i.e. the strongest weak channel, activate only the subset which fulfils a certain requirement for capacity or throughput or which maximizes it, activate only the subset which comprises the repeaters which have a composite channel path gain which exceeds a certain threshold.

27. The transceiver of claim 5, wherein the measured performance parameters further include the Channel Quality Indicator (CQI) of the one or more MIMO channels.

28. The system of claim 19, wherein the measured performance parameters further include the Channel Quality Indicator (CQI) of the one or more MIMO channels.

29. The system of claim 23, wherein the second subset of repeaters is different from the first subset of repeaters.

30. The transceiver of claim 1, in which the first transceiver is arranged to activate and/or deactivate first and/or second subsets of repeaters based on one or more of the following criteria:

for a certain channel rank Q to one or more user in the first cell, activate only the subset which renders the smallest ratio between the largest and smallest singular values including the channel condition number, for a certain channel rank Q to one or more user in the first cell, activate only the subset that renders the largest value for the smallest singular value $\lambda_Q$ including the strongest weak channel.

31. The transceiver of claim 1, in which the first transceiver is arranged to activate and/or deactivate first and/or second subsets of repeaters based on o the following criteria:

for a certain channel rank Q to one or more user in the first cell, activate only the subset which renders the smallest ratio between the largest and smallest singular values including the channel condition number.

32. The transceiver of claim 1, in which the first transceiver is arranged to activate and/or deactivate first and/or second subsets of repeaters based on one or more of the following criteria:

for a certain channel rank Q to one or more user in the first cell, activate only the subset that renders the largest value for the smallest singular value $\lambda_Q$ including the strongest weak channel.

33. The transceiver of claim 1, wherein the transceiver is arranged to activate the first subset of a plurality of repeaters upon determining that the first subset of repeaters fulfils a predetermined requirement for capacity or throughput.

34. The transceiver of claim 1, wherein the transceiver is arranged to activate the first subset of a plurality of repeaters upon determining that the first subset of repeaters maximize capacity or throughput.

35. The transceiver of claim 1, wherein the transceiver is arranged to activate the first subset of a plurality of repeaters upon determining that the first subset of repeaters has a composite channel path gain which exceeds a predetermined threshold.

* * * * *